United States Patent [19]
Carter

[11] Patent Number: 5,875,817
[45] Date of Patent: Mar. 2, 1999

[54] DIGITAL GAS METERING SYSTEM USING TRI-STABLE AND BI-STABLE SOLENOIDS

[75] Inventor: Stephen Carter, Mississauga, Canada

[73] Assignee: Ortech Corporation, Ontario, Canada

[21] Appl. No.: 699,498

[22] Filed: Aug. 19, 1996

Related U.S. Application Data

[60] Provisional application No. 60/002,417 Aug. 17, 1995.
[51] Int. Cl.[6] .................................................. F16K 11/24
[52] U.S. Cl. .................. 137/599; 251/129.08; 251/129.1
[58] Field of Search ............................ 137/599; 251/120, 251/121, 129.08, 129.1

[56] References Cited

U.S. PATENT DOCUMENTS

| | | | |
|---|---|---|---|
| 3,190,608 | 6/1965 | Hassa | 251/121 |
| 4,901,758 | 2/1990 | Cooke et al. | 137/487.5 |
| 5,150,690 | 9/1992 | Carter et al. | 137/599 X |
| 5,329,965 | 7/1994 | Gordon | 137/599 |
| 5,441,232 | 8/1995 | Tanaka | 251/129.08 X |

*Primary Examiner*—Stephen M. Hepperle
*Attorney, Agent, or Firm*—Shoemaker and Mattare, Ltd.

[57] ABSTRACT

A digital gas metering system includes inlet and outlet manifolds, a plurality of conduits each extending between the inlet manifold and the outlet manifold, and a solenoid-operated valve in each conduit. At least one of the valves is a tri-stable valve. Each tri-stable valve has a highest flow setting, a lowest flow setting, and an intermediate flow setting. The preferred embodiment utilizes at least two tri-stable valves, and these have respective highest flow settings which form a geometric progression in which each term is substantially triple the preceding term.

5 Claims, 3 Drawing Sheets

DIGITAL GAS METERING SYSTEM USING TRI-STABLE AND BI-STABLE SOLENOIDS

This invention relates generally to digital metering systems for controlling the delivery of gaseous material to a device which consumes or uses such material (e.g., industrial burners, engines, etc.), and has to do particularly with a digital gas metering system utilizing a plurality of solenoid-operated valves, all placed in parallel, such that any desired gas flow rate within the capacity of the valve arrangement can be closely approximated by utilizing one or more of the valves in combination. More specifically, at least one of the valves is a tri-stable valve.

BACKGROUND OF THIS INVENTION

In the prior art, it is already known to use a straight $2^n$ progression to determine the flow capacities of solenoid valves and orifices. The $2^n$ concept functions well and is fundamentally valid. However, it has a number of drawbacks, and it is useful here to discuss these in greater detail.

Firstly, the $2^n$ progression (1, 2, 4, 8, 16, 32, 64, 128, 256, etc.) requires a substantial number of solenoid valves. Naturally, the greater the number of solenoid valves, the greater is the cost in terms of additional solenoids, additional electrical driver channels, and a larger valve body. Also, the greater the number of solenoids, the greater the amount of electrical power that it requires.

The second drawback relates to the fact that, utilizing a straight $2^n$ progression, the smallest valve orifice is so tiny as to be difficult to machine (i.e. drill breakage, expensive EDM'ing, etc.).

A further drawback is that the largest orifice in the prior system may be difficult to open electromagnetically. Nominally, 50% of the total flow in this prior art system is provided by the largest orifice. Even if the largest orifice deviates from the $2^n$ rule to accommodate manufacturing issues, it would be common for the largest orifice to provide 36%–50% of the total rated flow. It is also well known that the larger the orifice to be opened (all other things being equal), the greater the electromagnetic force required to open it.

A final drawback of this prior system relates to the frequency at which the valves must be seated. Any design which could decrease the frequency of valve seating would improve the life expectancy of the system.

Another prior approach, as exemplified in U.S. Pat. No. 5,150,690, issued Sep. 29, 1992, uses a combination of two or more equal-flow-rate pulsing valves and one or more bi-stable valves in a modified $2^n$ progression. The latter concept is functional and fundamentally valid, however it also has four notable drawbacks, which are summarized below.

The first drawback is that the system is not efficient if continuous flow is required, i.e. requires a larger number of solenoids to accomplish the same flow. In the latter case, the first three solenoid valves must be operated as bi-stable flow devices. In that situation, the first three solenoids would have the maximum total flow capacity of 4·Q1 (i.e. Q1+Q1+2Q1). By comparison, the concept first above discussed would have a total capacity of 7·Q1 (Q1+2Q1+4Q1). (NOTE: For the present invention to have a minimum flow capacity (and increment) of Q1, its first 3 solenoids would typically be tri-stable and would typically have a total capacity of 26·Q1 (2Q1+6Q1+18Q1). As will be seen from the descriptive material below, the present invention allows the system to utilize two or three less solenoids than the prior development discussed in this section.)

A further drawback of the approach exemplified by U.S. Pat. No. 5,150,690 relates to the fact that pulsing solenoids limit the life expectancy of the system. In applications having long periods of continuous (steady) flow demand, the use of pulsing solenoids dramatically reduces the life of the total system (i.e. life to rebuild). For example, if a solenoid were pulsed at 60 Hz for 3 minutes, during which time the flow demand were unchanged, the valve would have experienced 10,800 seatings where none were "required".

A further drawback relates to the fact that commercially available pulsing solenoids are usable only in a narrow range of pressures and flows. Due to the high number of valve seatings expected during the product's life, commercially available pulsing solenoids tend to have metal-to-metal seats. In fact, the most common devices may be liquid fuel injectors adapted for this purpose. However, such devices are very capital intensive to produce and thus are targeted on a narrow range of working pressures and flows (typically 15–150 psig pressure and equivalent orifice diameters of <0.056"). Notably, pulsating solenoids for industrial use may be employed in applications ranging from 15–3000 psig and flow rates from 500 SCFH to 500,000 SCFH. Due to the capital intensive nature of these devices, pulsing solenoid (injector) manufacturers tend to be willing to change design features (working pressure, working voltage, orifice area) only for very high volumes that are not foreseeable for this type of product. As a result, pulsing injectors are not regarded as feasible for industrial use.

Another drawback is that pulsing solenoids are sensitive to manufacturing tolerances (orifice diameter and stroke), and are thus expensive. Pulsing solenoids, as mentioned above, tend to have a metal-to-metal seat. As a result, surface contours are held to very tight tolerances (especially if the seat is spherical), surface finishes are exceptionally smooth, and the sealing parts are most commonly lapped (i.e. with diamond grit) to achieve acceptable sealing capability. In most instances, the flow is controlled by a combination of orifice diameter and valve stroke. In manufacture, the production line systems measure, set, and stake the stroke to provide the nominal flow rate of each individual injector (solenoid). Further, as such devices are intended for ultra high speed uses where a few hundred microseconds are critical to performance, a second adjustment is usually made on each production line piece to adjust a spring pre-load that controls valve opening/closing time. The net result is that, even at volumes of millions per year, such devices are expensive. At low volumes, such as would be expected for digital gas metering, these devices are exceptionally expensive (i.e. if an off-the-shelf part cannot be used).

GENERAL DESCRIPTION OF THIS INVENTION

The present invention, in one of its forms, utilizes a series of bi-stable and tri-stable solenoid-enabled sonic orifices to digitally meter a gas. The use of tri-state orifice/solenoid sets provides greater dynamic range and fewer valve seatings for any given flow capacity and precision. The invention also tends to reduce the size of the maximum orifice that must be opened, thus extending the flow capacity of direct-acting solenoids.

As with the two prior concepts discussed in the previous section, this invention uses solenoid-controlled orifices to sonically meter gases in accordance with the ideal gas law. When a solenoid is opened, the resulting mass flow rate is determined by its orifice area (and other ideal gas law parameters). The orifice areas are arranged in a "digital ladder" sequence so that the sum of the lesser orifices' areas equals the area of the next larger orifice less the area of the smallest orifice. Proper selection of the enabled orifices provides a piece-wise continuous flow curve (i.e. the digital simulation of a linear flow curve) where the incremental steps in flow are equal to the flow from the smallest orifice. In the preferred embodiment, the orifice areas (e.g. flows) differ from a binary progression ($2^0$, $2^1$, $2^2$, $2^3$, $2^4$, $2^5$, etc.) in that the first two or more orifices are tri-stable orifices, each having a lowest flow setting, a highest flow setting and an intermediate flow setting. In the preferred embodiment, flow through the tri-stable orifices is such that their highest flow settings correspond to terms in a geometric progression of ratio 3 (i.e., each term is triple the preceding term), their intermediate flow settings are substantially 50% of the respective highest flow settings, and their lowest flow settings are substantially zero. It is pointed out that other values could be used to satisfy specific application requirements. Those individual values are switched independently for each tri-stable orifice as demanded by the instantaneous flow requirement.

This invention is nominally applicable to any supply pressure and any mass flow rate, so long as the flow is sonic. In practice, there will be a practical limit beyond which direct acting solenoids cannot work. That limit can be exceeded by either high flow rates (i.e. large orifices) or high pressures. Direct acting (unbalanced) solenoids are generally preferred in that they have the lowest cost and are the most reliable. The useful range of such direct acting solenoids can be extended by using active current foldback (e.g. high current to open the solenoid and low current to hold it open) or by voltage chopping (e.g. high current mode to open the solenoid, followed by high frequency on-off modulation of the voltage to provide lower solenoid hold-in power).

Where direct acting (unbalanced) solenoids are not powerful enough, pilot-operated solenoids or direct acting balanced solenoids can be used, with no loss in function or relevancy of this system concept. Where direct acting solenoids are impractical due to small orifice size, it may be possible to operate the lower flow solenoids with a separate common inlet manifold which is supplied with a lower input pressure (e.g. requires larger solenoid orifices to achieve required flow). Such potential would be constrained by the output backpressure that the entire system might encounter (e.g. supply pressure to the low pressure branch would have to be great enough to keep those orifices sonic at the system's maximum operating back pressure).

The present concept is intended to allow the individual application to have significant latitude in the selection of which valves are tri-stable and which ones are not. The primary stipulation is that at least one valve be a tri-stable valve. The lowest flow valve does not have to be a tri-stable valve. In fact, in low flow applications, it may be advantageous for one or more of the lowest flow valves to be bi-stable in order to have more easily manufacturable orifice sizes. The following example portrays such a situation:

| Solenoid/Valve No. | Type | Type. Orifice Diameter (") | Orifice Flow (SCFH) | | | Cumulative Flow SCFH) |
|---|---|---|---|---|---|---|
| | | | State 1 | State 2 | State 3 | |
| 1 | Bi-stable | .010" | 0 | n/a | 10 | 10 |
| 2 | Bi-stable | .014" | 0 | n/a | 20 | 30 |
| 3 | Tri-stable | .028" | 0 | 40 | 80 | 110 |
| 4 | Tri-stable | .049" | 0 | 120 | 240 | 350 |
| 5 | Tri-Stable | .084" | 0 | 360 | 720 | 1070 |
| | | | | | | 1070 |

This concept is applicable to a wide variety of gas metering purposes, including:
   metering of fuel gas to reciprocating engines;
   metering of fuel gas to turbine engines (examples below cover 3,000–35,000 BHP engines);
   pipeline metering of gases to manufacturing plants, steel mills, etc. (e.g. hydrogen, oxygen, nitrogen);
   metering of industrial process gases (transfer line pistons, cutters, forming tools, gas jets to move parts);
   metering of casting/molding assist gases (metal casting, plastic injection, blow molding, glass blowing).
   metering of medical gases (oxygen, nitrogen, nitrous oxide, etc.).

More particularly, this invention provides, for use with a digital gas metering system, the combination of:
   a common inlet manifold,
   a common outlet manifold,
   a plurality of conduits each extending between the inlet manifold and the outlet manifold,
   a solenoid-operated valve in each conduit,
   at least one of said valves being a bi-stable valves,
   at least two of said valves being tri-stable valves, each tri-stable valve having a highest flow setting, a lowest flow setting, and an intermediate flow setting; said lowest flow settings being substantially zero flow, and said highest flow settings forming a geometric progression in which each term is substantially triple the preceding term.

Although this invention contemplates an embodiment using a single tri-stable valve, the rest being bi-stable valves, the preferred embodiment involves at least two tri-stable valves.

In the preferred embodiment, each of the conduits defines a diverging pressure-recovery profile immediately downstream of its respective valve.

This invention also includes within its scope a complete digital gas metering system which includes the manifolds, conduits and valves already mentioned, and which includes sensor means for determining the inlet gas temperature and the stagnation absolute pressure. The system further includes control means for receiving the gas physical parameters, for calculating the required solenoid valve control signals, and for electrically driving the solenoids. Again in a preferred embodiment, the system can additionally include further sensor means for sensing the values of the outlet gas pressure and temperature, and for providing these values to the control means, thus permitting the calculations of the sub-sonic mass flow.

This invention is further exemplified in the charts below, showing orifice flow rates for various accuracies and total flow rates. The invention is also exemplified by the truth tables below, which show solenoid flow conditions for specific examples.

| Orifice sizing examples: 2000 to 300,000 SCFH flow capacities ||||||||
|---|---|---|---|---|---|---|---|
| Tot. FLOW | 300,000 | 300,000 | 300,000 | 300,000 | 300,000 | 300,000 | 300,000 |
| Accuracy | 0.10% | 0.10% | 0.10% | 0.20% | 0.20% | 0.25% | 0.25% |
| Flow Steps | 300 | 300 | 300 | 600 | 600 | 750 | 750 |
| 1 | 600 | 600 | 600 | 1,200 | 1,200 | 1,500 | 1,500 |
| 2 | 1,800 | 1,800 | 1,800 | 3,600 | 3,600 | 4,500 | 4,500 |
| 3 | 2,700 | 5,400 | 5,400 | 5,400 | 10,800 | 6,750 | 13,500 |
| 4 | 5,400 | 8,100 | 16,200 | 10,800 | 16,200 | 13,500 | 20,250 |
| 5 | 10,800 | 16,200 | 24,300 | 21,600 | 32,400 | 27,000 | 40,500 |
| 6 | 21,600 | 32,400 | 48,600 | 43,200 | 64,800 | 54,000 | 81,000 |
| 7 | 43,200 | 64,800 | 101,550 | 86,400 | 85,500 | 192,750 | 138,750 |
| 8 | 86,400 | 85,350 | 101,550 | 127,800 | 85,500 | | |
| 9 | 127,500 | 85,350 | | | | | |
| TOTAL | 300,000 | 300,000 | 300,000 | 300,000 | 300,000 | 300,000 | 300,000 |
| Tot. FLOW | 25,000 | 25,000 | 25,000 | 25,000 | 25,000 | 25,000 | 25,000 |
| Accuracy | 0.10% | 0.10% | 0.10% | 0.10% | 0.20% | 0.30% | 1.0% |
| Flow Steps | 25 | 25 | 25 | 25 | 50 | 75 | 250 |
| 1 | 50 | 50 | 50 | 50 | 100 | 150 | 500 |
| 2 | 150 | 150 | 150 | 150 | 300 | 450 | 1,500 |
| 3 | 450 | 450 | 450 | 450 | 900 | 1,350 | 4,500 |
| 4 | 675 | 1,350 | 1,350 | 1,350 | 1,350 | 2,025 | 6,750 |
| 5 | 1,350 | 2,025 | 4,050 | 4,050 | 2,700 | 4,050 | 11,750 |
| 6 | 2,700 | 4,050 | 6,075 | 6,075 | 5,400 | 8,100 | |
| 7 | 5,400 | 8,100 | 6,450 | 12,150 | 7,150 | 8,875 | |
| 8 | 10,800 | 8,825 | 6,450 | 725 | 7,150 | | |
| 9 | 3,425 | | | | | | |
| TOTAL | 25,000 | 25,000 | 25,025 | 25,000 | 25,050 | 25,000 | 25,000 |
| Tot. FLOW | 2,000 | 2,000 | 2,000 | 2,000 | 2,000 | 2,000 | 2,000 |
| Accuracy | 0.5% | 1.0% | 1.0% | 2.0% | 2.5% | 5.0% | 10.0% |
| Flow Steps | 10 | 20 | 20 | 40 | 50 | 100 | 200 |
| 1 | 20 | 40 | 40 | 80 | 100 | 200 | 400 |
| 2 | 60 | 120 | 120 | 240 | 300 | 600 | 1,200 |
| 3 | 180 | 360 | 360 | 720 | 900 | 600 | 400 |
| 4 | 540 | 540 | 1,080 | 960 | 700 | 600 | |
| 5 | 1,200 | 940 | 400 | | | | |
| TOTAL | 2,000 | 2,000 | 2,000 | 2,000 | 2,000 | 2,000 | 2,000 |

| 4 Valve DGM: 2000 SCFH, 2% steps ||||||
|---|---|---|---|---|---|
| | | Flow (SCFH) Contribution to Total [vs Valve No & Nom. Flow rate] ||||
| Line No | Total Flow | 1 80 | 2 240 | 3 720 | 4 960 |
| 1 | 40 | 40 | | | |
| 2 | 80 | 80 | | | |
| 3 | 120 | | 120 | | |
| 4 | 160 | 40 | 120 | | |
| 5 | 200 | 80 | 120 | | |
| 6 | 240 | | 240 | | |
| 7 | 280 | 40 | 240 | | |
| 8 | 320 | 80 | 240 | | |
| 9 | 360 | | | 360 | |
| 10 | 400 | 40 | | 360 | |
| 11 | 440 | 80 | | 360 | |
| 12 | 480 | | 120 | 360 | |
| 13 | 520 | 40 | 120 | 360 | |
| 14 | 560 | 80 | 120 | 360 | |
| 15 | 600 | | 240 | 360 | |
| 16 | 640 | 40 | 240 | 360 | |
| 17 | 680 | 80 | 240 | 360 | |
| 18 | 720 | | | 720 | |
| 19 | 760 | 40 | | 720 | |
| 20 | 800 | 80 | | 720 | |
| 21 | 840 | | 120 | 720 | |
| 22 | 880 | 40 | 120 | 720 | |
| 23 | 920 | 80 | 120 | 720 | |
| 24 | 960 | | | | 960 |
| 25 | 1000 | 40 | | | 960 |
| 26 | 1040 | 80 | | | 960 |
| 27 | 1080 | | 120 | | 960 |
| 28 | 1120 | 40 | 120 | | 960 |
| 29 | 1160 | 80 | 120 | | 960 |
| 30 | 1200 | | 240 | | 960 |
| 31 | 1240 | 40 | 240 | | 960 |
| 32 | 1280 | 80 | 240 | | 960 |
| 33 | 1320 | | | 360 | 960 |
| 34 | 1360 | 40 | | 360 | 960 |
| 35 | 1400 | 80 | | 360 | 960 |
| 36 | 1440 | | 120 | 360 | 960 |
| 37 | 1480 | 40 | 120 | 360 | 960 |
| 38 | 1520 | 80 | 120 | 360 | 960 |
| 39 | 1560 | | 240 | 360 | 960 |
| 40 | 1600 | 40 | 240 | 360 | 960 |
| 41 | 1640 | 80 | 240 | 360 | 960 |
| 42 | 1680 | | | 720 | 960 |

4 Valve DGM: 2000 SCFH, 2% steps

Flow (SCFH) Contribution to Total
[vs Valve No & Nom. Flow rate]

| Line No | Total Flow | 1 [80] | 2 [240] | 3 [720] | 4 960 |
|---|---|---|---|---|---|
| 43 | 1720 | 40 |  | 720 | 960 |
| 44 | 1760 | 80 |  | 720 | 960 |
| 45 | 1800 |  | 120 | 720 | 960 |
| 46 | 1840 | 40 | 120 | 720 | 960 |
| 47 | 1880 | 80 | 120 | 720 | 960 |
| 48 | 1920 |  | 240 | 720 | 960 |
| 49 | 1960 | 40 | 240 | 720 | 960 |
| 50 | 2000 | 80 | 240 | 720 | 960 |

4 Valve DGM: 2000 SCFH, 5% steps

Flow (SCFH) Contribution to Total
[vs Valve No & Nom. Flow rate]

| Line No | Total Flow | 1 [200] | 2 [600] | 3 600 | 4 600 |
|---|---|---|---|---|---|
| 1 | 100 | 100 |  |  |  |
| 2 | 200 | 200 |  |  |  |
| 3 | 300 |  | 300 |  |  |
| 4 | 400 | 100 | 300 |  |  |
| 5 | 500 | 200 | 300 |  |  |
| 6 | 600 |  |  | 600 |  |
| 7 | 700 | 100 |  | 600 |  |
| 8 | 800 | 200 |  | 600 |  |
| 9 | 900 |  | 300 | 600 |  |
| 10 | 1000 | 100 | 300 | 600 |  |
| 11 | 1100 | 200 | 300 | 600 |  |
| 12 | 1200 |  |  | 600 | 600 |
| 13 | 1300 | 100 |  | 600 | 600 |
| 14 | 1400 | 200 |  | 600 | 600 |
| 15 | 1500 |  | 300 | 600 | 600 |
| 16 | 1600 | 100 | 300 | 600 | 600 |
| 17 | 1700 | 200 | 300 | 600 | 600 |
| 18 | 1800 |  | 600 | 600 | 600 |
| 19 | 1900 | 100 | 600 | 600 | 600 |
| 20 | 2000 | 200 | 600 | 600 | 600 |

5 Valve DGM: 25,000 SCFH, 1% steps

Flow (SCFH) Contribution to Total
[vs Valve No & Nom. Flow rate]

| Line No | Total Flow | 1 [500] | 2 [1,500] | 3 [4,500] | 4 6,750 | 5 11,750 |
|---|---|---|---|---|---|---|
|  | 250 | 250 |  |  |  |  |
|  | 500 | 500 |  |  |  |  |
|  | 750 |  | 750 |  |  |  |
|  | 1,000 | 250 | 750 |  |  |  |
|  | 1,250 | 500 | 750 |  |  |  |
|  | 1,500 |  | 1,500 |  |  |  |
|  | 1,750 | 250 | 1,500 |  |  |  |
|  | 2,000 | 500 | 1,500 |  |  |  |
|  | 2,250 |  |  | 2,250 |  |  |
|  | 2,500 | 250 |  | 2,250 |  |  |
|  | 2,750 | 500 |  | 2,250 |  |  |
|  | 3,000 |  | 750 | 2,250 |  |  |
|  | 3,250 | 250 | 750 | 2,250 |  |  |
|  | 3,500 | 500 | 750 | 2,250 |  |  |
|  | 3,750 |  | 1,500 | 2,250 |  |  |
|  | 4,000 | 250 | 1,500 | 2,250 |  |  |
|  | 4,250 | 500 | 1,500 | 2,250 |  |  |
|  | 4,500 |  |  | 4,500 |  |  |
|  | 4,750 | 250 |  | 4,500 |  |  |
|  | 5,000 | 500 |  | 4,500 |  |  |
|  | 5,250 |  | 750 | 4,500 |  |  |
|  | 5,500 | 250 | 750 | 4,500 |  |  |
|  | 5,750 | 500 | 750 | 4,500 |  |  |
|  | 6,000 |  | 1,500 | 4,500 |  |  |
|  | 6,250 | 250 | 1,500 | 4,500 |  |  |
|  | 6,500 | 500 | 1,500 | 4,500 |  |  |
|  | 6,750 |  |  |  | 6,750 |  |
|  | 7,000 | 250 |  |  | 6,750 |  |
|  | 7,250 | 500 |  |  | 6,750 |  |
|  | 7,500 |  | 750 |  | 6,750 |  |
|  | 7,750 | 250 | 750 |  | 6,750 |  |
|  | 8,000 | 500 | 750 |  | 6,750 |  |
|  | 8,250 |  | 1,500 |  | 6,750 |  |
|  | 8,500 | 250 | 1,500 |  | 6,750 |  |
|  | 8,750 | 500 | 1,500 |  | 6,750 |  |
|  | 9,000 |  |  | 2,250 | 6,750 |  |
|  | 9,250 | 250 |  | 2,250 | 6,750 |  |
|  | 9,500 | 500 |  | 2,250 | 6,750 |  |
|  | 9,750 |  | 750 | 2,250 | 6,750 |  |
|  | 10,000 | 250 | 750 | 2,250 | 6,750 |  |
|  | 10,250 | 500 | 750 | 2,250 | 6,750 |  |
|  | 10,500 |  | 1,500 | 2,250 | 6,750 |  |
|  | 10,750 | 250 | 1,500 | 2,250 | 6,750 |  |
|  | 11,000 | 500 | 1,500 | 2,250 | 6,750 |  |
|  | 11,250 |  |  | 4,500 | 6,750 |  |
|  | 11,500 | 250 |  | 4,500 | 6,750 |  |
|  | 11,750 |  |  |  |  | 11,750 |
|  | 12,000 | 250 |  |  |  | 11,750 |
|  | 12,250 | 500 |  |  |  | 11,750 |
|  | 12,500 |  | 750 |  |  | 11,750 |
| 51 | 12,750 | 250 | 750 |  |  | 11,750 |
| 52 | 13,000 | 500 | 750 |  |  | 11,750 |
| 53 | 13,250 |  | 1,500 |  |  | 11,750 |
| 54 | 13,500 | 250 | 1,500 |  |  | 11,750 |
| 55 | 13,750 | 500 | 1,500 |  |  | 11,750 |
| 56 | 14,000 |  |  | 2,250 |  | 11,750 |
| 57 | 14,250 | 250 |  | 2,250 |  | 11,750 |
| 58 | 14,500 | 500 |  | 2,250 |  | 11,750 |
| 59 | 14,750 |  | 750 | 2,250 |  | 11,750 |
| 60 | 15,000 | 250 | 750 | 2,250 |  | 11,750 |
| 61 | 15,250 | 500 | 750 | 2,250 |  | 11,750 |
| 62 | 15,500 |  | 1,500 | 2,250 |  | 11,750 |
| 63 | 15,750 | 250 | 1,500 | 2,250 |  | 11,750 |
| 64 | 16,000 | 500 | 1,500 | 2,250 |  | 11,750 |
| 65 | 16,250 |  |  | 4,500 |  | 11,750 |
| 66 | 16,500 | 250 |  | 4,500 |  | 11,750 |
| 67 | 16,750 | 500 |  | 4,500 |  | 11,750 |
| 68 | 17,000 |  | 750 | 4,500 |  | 11,750 |
| 69 | 17,250 | 250 | 750 | 4,500 |  | 11,750 |
| 70 | 17,500 | 500 | 750 | 4,500 |  | 11,750 |
| 71 | 17,750 |  | 1,500 | 4,500 |  | 11,750 |
| 72 | 18,000 | 250 | 1,500 | 4,500 |  | 11,750 |
| 73 | 18,250 | 500 | 1,500 | 4,500 |  | 11,750 |
| 74 | 18,500 |  |  |  | 6,750 | 11,750 |
| 75 | 18,750 | 250 |  |  | 6,750 | 11,750 |
| 76 | 19,000 | 500 |  |  | 6,750 | 11,750 |
| 77 | 19,250 |  | 750 |  | 6,750 | 11,750 |
| 78 | 19,500 | 250 | 750 |  | 6,750 | 11,750 |
| 79 | 19,750 | 500 | 750 |  | 6,750 | 11,750 |
| 80 | 20,000 |  | 1,500 |  | 6,750 | 11,750 |
| 81 | 20,250 | 250 | 1,500 |  | 6,750 | 11,750 |
| 82 | 20,500 | 500 | 1,500 |  | 6,750 | 11,750 |
| 83 | 20,750 |  |  | 2,250 | 6,750 | 11,750 |
| 84 | 21,000 | 250 |  | 2,250 | 6,750 | 11,750 |
| 85 | 21,250 | 500 |  | 2,250 | 6,750 | 11,750 |
| 86 | 21,500 |  | 750 | 2,250 | 6,750 | 11,750 |
| 87 | 21,750 | 250 | 750 | 2,250 | 6,750 | 11,750 |
| 88 | 22,000 | 500 | 750 | 2,250 | 6,750 | 11,750 |
| 89 | 22,250 |  | 1,500 | 2,250 | 6,750 | 11,750 |
| 90 | 22,500 | 250 | 1,500 | 2,250 | 6,750 | 11,750 |
| 91 | 22,750 | 500 | 1,500 | 2,250 | 6,750 | 11,750 |

-continued

5 Valve DGM: 25,000 SCFH, 1% steps

Flow (SCFH) Contribution to Total
[vs Valve No & Nom. Flow rate]

| Line No | Total Flow | 1 [500] | 2 [1,500] | 3 [4,500] | 4 6,750 | 5 11,750 |
|---|---|---|---|---|---|---|
| 92 | 23,000 | | | 4,500 | 6,750 | 11,750 |
| 93 | 23,250 | 250 | | 4,500 | 6,750 | 11,750 |
| 94 | 23,500 | 500 | | 4,500 | 6,750 | 11,750 |
| 95 | 23,750 | | 750 | 4,500 | 6,750 | 11,750 |
| 96 | 24,000 | 250 | 750 | 4,500 | 6,750 | 11,750 |
| 97 | 24,250 | 500 | 750 | 4,500 | 6,750 | 11,750 |
| 98 | 24,500 | | 1,500 | 4,500 | 6,750 | 11,750 |
| 99 | 24,750 | 250 | 1,500 | 4,500 | 6,750 | 11,750 |
| 100 | 25,000 | 500 | 1,500 | 4,500 | 6,750 | 11,750 |

Subject Matter:
Digital Gas Metering (DGM) Summary: 40,000 SCFH Device

Performance Features vs Resolution (flow step size)

| | .50% (200 scfh) | | .40% (160 scfh) | | .25% (100 scfh) | | .20% (80 scfh) | | .10% (40 scfh) | |
|---|---|---|---|---|---|---|---|---|---|---|
| | Binary | DGM | Binary | DGM | Binary | DGM | Binary | DGM | Binary | DGM |
| Valves | 8 | 6 | 8 | 7 | 9 | 7 | 9 | 7 | 9 | 7 |
| Valve seatings: | | | | | | | | | | |
| total | 199 | 103 | 249 | 129 | 399 | 202 | 510 | 259 | 999 | 505 |
| relative | 100% | 52% | 100% | 52% | 100% | 51% | 100% | 51% | 100% | 51% |
| Max. orifice: | | | | | | | | | | |
| scfh | 14,600 | 19,200 | 19,680 | 11,680 | 14,500 | 12,000 | 20,039 | 12,480 | 20,480 | 14,080 |
| relative | 100% | 132% | 100% | 59% | 100% | 83% | 100% | 62% | 100% | 69% |
| Turndown ratio | 200:1 | 200:1 | 250:1 | 250:1 | 400:1 | 400:1 | 500:1 | 500:1 | 1000:1 | 1000:1 |

Digital Metering Approaches:
Orifice Sizing and Performance Factors

Subject Matter:

Classic BINARY Concept: flow steps of

| | 0.50% | | 0.40% | | 0.25% | | 0.20% | | 0.10% | |
|---|---|---|---|---|---|---|---|---|---|---|
| Valve No. | Flow | Seats | Flow | Seats | Flow | Seats | Flow | Seats | Flow | Seats |
| 1 | 200 | 100 | 160 | 125 | 100 | 200 | 78 | 256 | 40 | 500 |
| 2 | 400 | 50 | 320 | 63 | 200 | 100 | 157 | 128 | 80 | 250 |
| 3 | 800 | 25 | 640 | 31 | 400 | 50 | 313 | 64 | 160 | 125 |
| 4 | 1,600 | 13 | 1,280 | 16 | 800 | 25 | 626 | 32 | 320 | 63 |
| 5 | 3,200 | 6 | 2,560 | 8 | 1,600 | 13 | 1,252 | 16 | 640 | 31 |
| 6 | 6,400 | 3 | 5,120 | 4 | 3,200 | 6 | 2,505 | 8 | 1280 | 16 |
| 7 | 12,800 | 2 | 10,240 | 2 | 6,400 | 3 | 5,010 | 4 | 2560 | 8 |
| 8 | 14,600 | 1 | 19,680 | 1 | 12,800 | 2 | 10,019 | 2 | 5120 | 4 |
| 9 | | | | | 14,500 | 1 | 20,039 | 1 | 10240 | 2 |
| 10 | | | | | | | | | 20480 | 1 |
| Total | 40,000 | 199 | 40,000 | 249 | 40,000 | 399 | 40,000 | 510 | 40,920 | 999 |

ORTECH Digital Gas Metering Concept: flow steps of

| 0.50% | | 0.40% | | 0.25% | | 0.20% | | 0.10% | |
|---|---|---|---|---|---|---|---|---|---|
| Flow | Seats | Flow | Seats | Flow | Seats | Flow | Seats | Flow | Seats |

-continued

Digital Metering Approaches:
Orifice Sizing and Performance Factors

| | | | | | | | | | | | |
|---|---|---|---|---|---|---|---|---|---|---|---|
| 1 | 400 | 67 | 320 | 83 | 200 | 133 | 156 | 171 | 80 | 333 |
| 2 | 1,200 | 22 | 960 | 28 | 600 | 44 | 468 | 57 | 160 | 111 |
| 3 | 3,600 | 7 | 2880 | 9 | 1,800 | 15 | 1404 | 19 | 480 | 37 |
| 4 | 5,200 | 4 | 4160 | 5 | 5,400 | 5 | 4212 | 6 | 1,440 | 12 |
| 5 | 10,400 | 2 | 8320 | 2 | 8,000 | 2 | 6240 | 3 | 4,320 | 6 |
| 6 | 19,200 | 1 | 11680 | 1 | 12,000 | 1 | 12,480 | 2 | 6,480 | 3 |
| 7 | | | 11680 | 1 | 12,000 | 1 | 15,040 | 1 | 12,960 | 1 |
| 8 | | | | | | | | | 14,080 | 1 |
| | 40,000 | 103 | 40,000 | 129 | 40,000 | 202 | 40,000 | 259 | 40,000 | 505 |

\*\*: seats indcates approx. number of times the individual valves close in going from 0% – 100% Flow
\*: indicates Tri-state valves (100% flow rate shown)

Subject Matter:
DGM Example: 7 orifices (4 tri-state), .25% steps

Orifice No. (Max Flow), Actual Flow at Specific Points

| TOTAL FLOW (SCFH) | Tri-stable solenoids | | | | Bi-stable solenoids | | |
|---|---|---|---|---|---|---|---|
| | 1 (200) | 2 (600) | 3 (1,800) | 4 (5,400) | 5 (8,000) | 6 (12,000) | 7 (12,000) |
| 100 | 100 | | | | | | |
| 200 | 200 | | | | | | |
| 300 | | 300 | | | | | |
| 400 | 100 | 300 | | | | | |
| 500 | 200 | 300 | | | | | |
| 600 | | 600 | | | | | |
| 700 | 100 | 600 | | | | | |
| 800 | 200 | 600 | | | | | |
| 900 | | | 900 | | | | |
| 1,000 | 100 | | 900 | | | | |
| 1,100 | 200 | | 900 | | | | |
| 1,200 | | 300 | 900 | | | | |
| 1,300 | 100 | 300 | 900 | | | | |
| 1,400 | 200 | 300 | 900 | | | | |
| 1,500 | | 600 | 900 | | | | |
| 1,600 | 100 | 600 | 900 | | | | |
| 1,700 | 200 | 600 | 900 | | | | |
| 1,800 | | | 1800 | | | | |
| 1,900 | 100 | | 1800 | | | | |
| 2,000 | 200 | | 1800 | | | | |
| 2,100 | | 300 | 1800 | | | | |
| 2,200 | 100 | 300 | 1800 | | | | |
| 2,300 | 200 | 300 | 1800 | | | | |
| 2,400 | | 600 | 1800 | | | | |
| 2,500 | 100 | 600 | 1800 | | | | |
| 2,600 | 200 | 600 | 1800 | | | | |
| 2,700 | | | | 2700 | | | |
| 2,800 | 100 | | | 2700 | | | |
| 2,900 | 200 | | | 2700 | | | |
| 3,000 | | 300 | | 2700 | | | |
| 3,100 | 100 | 300 | | 2700 | | | |
| 3,200 | 200 | 300 | | 2700 | | | |
| 3,300 | | 600 | | 2700 | | | |
| 3,400 | 100 | 600 | | 2700 | | | |
| 3,500 | 200 | 600 | | 2700 | | | |
| 3,600 | | | 900 | 2700 | | | |
| 3,700 | 100 | | 900 | 2700 | | | |
| 3,800 | 200 | | 900 | 2700 | | | |
| 3,900 | | 300 | 900 | 2700 | | | |
| 4,000 | 100 | 300 | 900 | 2700 | | | |
| 4,100 | 200 | 300 | 900 | 2700 | | | |
| 4,200 | | 600 | 900 | 2700 | | | |
| 4,300 | 100 | 600 | 900 | 2700 | | | |
| 4,400 | 200 | 600 | 900 | 2700 | | | |
| 4,500 | | | 1800 | 2700 | | | |
| 4,600 | 100 | | 1800 | 2700 | | | |
| 4,700 | 200 | | 1800 | 2700 | | | |
| 4,800 | | 300 | 1800 | 2700 | | | |
| 4,900 | 100 | 300 | 1800 | 2700 | | | |
| 5,000 | 200 | 300 | 1800 | 2700 | | | |
| 5,100 | | 600 | 1800 | 2700 | | | |
| 5,200 | 100 | 600 | 1800 | 2700 | | | |
| 5,300 | 200 | 600 | 1800 | 2700 | | | |
| 5,400 | | | | 5400 | | | |
| 5,500 | 100 | | | 5400 | | | |
| 5,600 | 200 | | | 5400 | | | |
| 5,700 | | 300 | | 5400 | | | |
| 5,800 | 100 | 300 | | 5400 | | | |
| 5,900 | 200 | 300 | | 5400 | | | |
| 6,000 | | 600 | | 5400 | | | |
| 6,100 | 100 | 600 | | 5400 | | | |
| 6,200 | 200 | 600 | | 5400 | | | |
| 6,300 | | | 900 | 5400 | | | |
| 6,400 | 100 | | 900 | 5400 | | | |
| 6,500 | 200 | | 900 | 5400 | | | |
| 6,600 | | 300 | 900 | 5400 | | | |
| 6,700 | 100 | 300 | 900 | 5400 | | | |
| 6,800 | 200 | 300 | 900 | 5400 | | | |
| 6,900 | | 600 | 900 | 5400 | | | |
| 7,000 | 100 | 600 | 900 | 5400 | | | |
| 7,100 | 200 | 600 | 900 | 5400 | | | |
| 7,200 | | | 1800 | 5400 | | | |
| 7,300 | 100 | | 1800 | 5400 | | | |
| 7,400 | 200 | | 1800 | 5400 | | | |
| 7,500 | | 300 | 1800 | 5400 | | | |
| 7,600 | 100 | 300 | 1800 | 5400 | | | |
| 7,700 | 200 | 300 | 1800 | 5400 | | | |
| 7,800 | | 600 | 1800 | 5400 | | | |
| 7,900 | 100 | 600 | 1800 | 5400 | | | |
| 8,000 | | | | | 8000 | | |
| 8,100 | 100 | | | | 8000 | | |
| 8,200 | 200 | | | | 8000 | | |
| 8,300 | | 300 | | | 8000 | | |
| 8,400 | 100 | 300 | | | 8000 | | |
| 8,500 | 200 | 300 | | | 8000 | | |
| 8,600 | | 600 | | | 8000 | | |
| 8,700 | 100 | 600 | | | 8000 | | |
| 8,800 | 200 | 600 | | | 8000 | | |
| 8,900 | | | 900 | | 8000 | | |
| 9,000 | 100 | | 900 | | 8000 | | |
| 9,100 | 200 | | 900 | | 8000 | | |
| 9,200 | | 300 | 900 | | 8000 | | |
| 9,300 | 100 | 300 | 900 | | 8000 | | |
| 9,400 | 200 | 300 | 900 | | 8000 | | |
| 9,500 | | 600 | 900 | | 8000 | | |
| 9,600 | 100 | 600 | 900 | | 8000 | | |
| 9,700 | 200 | 600 | 900 | | 8000 | | |
| 9,800 | | | 1800 | | 8000 | | |

Subject Matter:
DGM Example: 7 orifices (4 tri-state), .25% steps

Orifice No. (Max Flow), Actual Flow at Specific Points

| TOTAL FLOW (SCFH) | Tri-stable solenoids | | | | Bi-stable solenoids | | |
|---|---|---|---|---|---|---|---|
| | 1 (200) | 2 (600) | 3 (1,800) | 4 (5,400) | 5 (8,000) | 6 (12,000) | 7 (12,000) |
| 9,900 | 100 | | 1800 | | 8000 | | |
| 10,000 | 200 | | 1800 | | 8000 | | |
| 10,100 | | 300 | 1800 | | 8000 | | |
| 10,200 | 100 | 300 | 1800 | | 8000 | | |
| 10,300 | 200 | 300 | 1800 | | 8000 | | |
| 10,400 | | 600 | 1800 | | 8000 | | |
| 10,500 | 100 | 600 | 1800 | | 8000 | | |
| 10,600 | 200 | 600 | 1800 | | 8000 | | |
| 10,700 | | | | 2700 | 8000 | | |
| 10,800 | 100 | | | 2700 | 8000 | | |
| 10,900 | 200 | | | 2700 | 8000 | | |
| 11,000 | | 300 | | 2700 | 8000 | | |
| 11,100 | 100 | 300 | | 2700 | 8000 | | |
| 11,200 | 200 | 300 | | 2700 | 8000 | | |
| 11,300 | | 600 | | 2700 | 8000 | | |
| 11,400 | 100 | 600 | | 2700 | 8000 | | |
| 11,500 | 200 | 600 | | 2700 | 8000 | | |
| 11,600 | | | 900 | 2700 | 8000 | | |
| 11,700 | 100 | | 900 | 2700 | 8000 | | |
| 11,800 | 200 | | 900 | 2700 | 8000 | | |
| 11,900 | | 300 | 900 | 2700 | 8000 | | |
| 12,000 | | | | | | 12000 | |
| 12,100 | 100 | | | | | 12000 | |
| 12,200 | 200 | | | | | 12000 | |
| 12,300 | | 300 | | | | 12000 | |
| 12,400 | 100 | 300 | | | | 12000 | |
| 12,500 | 200 | 300 | | | | 12000 | |
| 12,600 | | 600 | | | | 12000 | |
| 12,700 | 100 | 600 | | | | 12000 | |
| 12,800 | 200 | 600 | | | | 12000 | |
| 12,900 | | | 900 | | | 12000 | |
| 13,000 | 100 | | 900 | | | 12000 | |
| 13,100 | 200 | | 900 | | | 12000 | |
| 13,200 | | 300 | 900 | | | 12000 | |
| 13,300 | 100 | 300 | 900 | | | 12000 | |
| 13,400 | 200 | 300 | 900 | | | 12000 | |
| 13,500 | | 600 | 900 | | | 12000 | |
| 13,600 | 100 | 600 | 900 | | | 12000 | |
| 13,700 | 200 | 600 | 900 | | | 12000 | |
| 13,800 | | | 1800 | | | 12000 | |
| 13,900 | 100 | | 1800 | | | 12000 | |
| 14,000 | 200 | | 1800 | | | 12000 | |
| 14,100 | | 300 | 1800 | | | 12000 | |
| 14,200 | 100 | 300 | 1800 | | | 12000 | |
| 14,300 | 200 | 300 | 1800 | | | 12000 | |
| 14,400 | | 600 | 1800 | | | 12000 | |
| 14,500 | 100 | 600 | 1800 | | | 12000 | |
| 14,600 | 200 | 600 | 1800 | | | 12000 | |
| 14,700 | | | | 2700 | | 12000 | |
| 14,800 | 100 | | | 2700 | | 12000 | |
| 14,900 | 200 | | | 2700 | | 12000 | |
| 15,000 | | 300 | | 2700 | | 12000 | |
| 15,100 | 100 | 300 | | 2700 | | 12000 | |
| 15,200 | 200 | 300 | | 2700 | | 12000 | |
| 15,300 | | 600 | | 2700 | | 12000 | |
| 15,400 | 100 | 600 | | 2700 | | 12000 | |
| 15,500 | 200 | 600 | | 2700 | | 12000 | |
| 15,600 | | | 900 | 2700 | | 12000 | |
| 15,700 | 100 | | 900 | 2700 | | 12000 | |
| 15,800 | 200 | | 900 | 2700 | | 12000 | |
| 15,900 | | 300 | 900 | 2700 | | 12000 | |
| 16,000 | 100 | 300 | 900 | 2700 | | 12000 | |
| 16,100 | 200 | 300 | 900 | 2700 | | 12000 | |
| 16,200 | | 600 | 900 | 2700 | | 12000 | |
| 16,300 | 100 | 600 | 900 | 2700 | | 12000 | |
| 16,400 | 200 | 600 | 900 | 2700 | | 12000 | |
| 16,500 | | | 1800 | 2700 | | 12000 | |
| 16,600 | 100 | | 1800 | 2700 | | 12000 | |
| 16,700 | 200 | | 1800 | 2700 | | 12000 | |
| 16,800 | | 300 | 1800 | 2700 | | 12000 | |
| 16,900 | 100 | 300 | 1800 | 2700 | | 12000 | |
| 17,000 | 200 | 300 | 1800 | 2700 | | 12000 | |
| 17,100 | | 600 | 1800 | 2700 | | 12000 | |
| 17,200 | 100 | 600 | 1800 | 2700 | | 12000 | |
| 17,300 | 200 | 600 | 1800 | 2700 | | 12000 | |
| 17,400 | | | | 5400 | | 12000 | |
| 17,500 | 100 | | | 5400 | | 12000 | |
| 17,600 | 200 | | | 5400 | | 12000 | |
| 17,700 | | 300 | | 5400 | | 12000 | |
| 17,800 | 100 | 300 | | 5400 | | 12000 | |
| 17,900 | 200 | 300 | | 5400 | | 12000 | |
| 18,000 | | 600 | | 5400 | | 12000 | |
| 18,100 | 100 | 600 | | 5400 | | 12000 | |
| 18,200 | 200 | 600 | | 5400 | | 12000 | |
| 18,300 | | | 900 | 5400 | | 12000 | |
| 18,400 | 100 | | 900 | 5400 | | 12000 | |
| 18,500 | 200 | | 900 | 5400 | | 12000 | |
| 18,600 | | 300 | 900 | 5400 | | 12000 | |
| 18,700 | 100 | 300 | 900 | 5400 | | 12000 | |
| 18,800 | 200 | 300 | 900 | 5400 | | 12000 | |
| 18,900 | | 600 | 900 | 5400 | | 12000 | |
| 19,000 | 100 | 600 | 900 | 5400 | | 12000 | |
| 19,100 | 200 | 600 | 900 | 5400 | | 12000 | |
| 19,200 | | | 1800 | 5400 | | 12000 | |
| 19,300 | 100 | | 1800 | 5400 | | 12000 | |
| 19,400 | 200 | | 1800 | 5400 | | 12000 | |
| 19,500 | | 300 | 1800 | 5400 | | 12000 | |
| 19,600 | 100 | 300 | 1800 | 5400 | | 12000 | |
| 19,700 | 200 | 300 | 1800 | 5400 | | 12000 | |
| 19,800 | | 600 | 1800 | 5400 | | 12000 | |
| 19,900 | 100 | 600 | 1800 | 5400 | | 12000 | |
| 20,000 | | | | | 8000 | 12000 | |
| 20,100 | 100 | | | | 8000 | 12000 | |
| 20,200 | 200 | | | | 8000 | 12000 | |
| 20,300 | | 300 | | | 8000 | 12000 | |
| 20,400 | 100 | 300 | | | 8000 | 12000 | |
| 20,500 | 200 | 300 | | | 8000 | 12000 | |
| 20,600 | | 600 | | | 8000 | 12000 | |
| 20,700 | 100 | 600 | | | 8000 | 12000 | |
| 20,800 | 200 | 600 | | | 8000 | 12000 | |
| 20,900 | | | 900 | | 8000 | 12000 | |
| 21,000 | 100 | | 900 | | 8000 | 12000 | |
| 21,100 | 200 | | 900 | | 8000 | 12000 | |
| 21,200 | | 300 | 900 | | 8000 | 12000 | |
| 21,300 | 100 | 300 | 900 | | 8000 | 12000 | |
| 21,400 | 200 | 300 | 900 | | 8000 | 12000 | |
| 21,500 | | 600 | 900 | | 8000 | 12000 | |
| 21,600 | 100 | 600 | 900 | | 8000 | 12000 | |
| 21,700 | 200 | 600 | 900 | | 8000 | 12000 | |
| 21,800 | | | 1800 | | 8000 | 12000 | |
| 21,900 | 100 | | 1800 | | 8000 | 12000 | |
| 22,000 | 200 | | 1800 | | 8000 | 12000 | |
| 22,100 | | 300 | 1800 | | 8000 | 12000 | |
| 22,200 | 100 | 300 | 1800 | | 8000 | 12000 | |
| 22,300 | 200 | 300 | 1800 | | 8000 | 12000 | |
| 22,400 | | 600 | 1800 | | 8000 | 12000 | |

-continued

Subject Matter:
DGM Example: 7 orifices (4 tri-state), .25% steps

Orifice No. (Max Flow), Actual Flow at Specific Points

| TOTAL FLOW (SCFH) | Tri-stable solenoids | | | | Bi-stable solenoids | | |
|---|---|---|---|---|---|---|---|
| | 1 (200) | 2 (600) | 3 (1,800) | 4 (5,400) | 5 (8,000) | 6 (12,000) | 7 (12,000) |
| 22,500 | 100 | 600 | 1800 |  | 8000 | 12000 |  |
| 22,600 | 200 | 600 | 1800 |  | 8000 | 12000 |  |
| 22,700 |  |  |  | 2700 | 8000 | 12000 |  |
| 22,800 | 100 |  |  | 2700 | 8000 | 12000 |  |
| 22,900 | 200 |  |  | 2700 | 8000 | 12000 |  |
| 23,000 |  | 300 |  | 2700 | 8000 | 12000 |  |
| 23,100 | 100 | 300 |  | 2700 | 8000 | 12000 |  |
| 23,200 | 200 | 300 |  | 2700 | 8000 | 12000 |  |
| 23,300 |  | 600 |  | 2700 | 8000 | 12000 |  |
| 23,400 | 100 | 600 |  | 2700 | 8000 | 12000 |  |
| 23,500 | 200 | 600 |  | 2700 | 8000 | 12000 |  |
| 23,600 |  |  | 900 | 2700 | 8000 | 12000 |  |
| 23,700 | 100 |  | 900 | 2700 | 8000 | 12000 |  |
| 23,800 | 200 |  | 900 | 2700 | 8000 | 12000 |  |
| 23,900 |  | 300 | 900 | 2700 | 8000 | 12000 |  |
| 24,000 |  |  |  |  |  | 12000 | 12000 |
| 24,100 | 100 |  |  |  |  | 12000 | 12000 |
| 24,200 | 200 |  |  |  |  | 12000 | 12000 |
| 24,300 |  | 300 |  |  |  | 12000 | 12000 |
| 24,400 | 100 | 300 |  |  |  | 12000 | 12000 |
| 24,500 | 200 | 300 |  |  |  | 12000 | 12000 |
| 24,600 |  | 600 |  |  |  | 12000 | 12000 |
| 24,700 | 100 | 600 |  |  |  | 12000 | 12000 |
| 24,800 | 200 | 600 |  |  |  | 12000 | 12000 |
| 24,900 |  |  | 900 |  |  | 12000 | 12000 |
| 25,000 | 100 |  | 900 |  |  | 12000 | 12000 |
| 25,100 | 200 |  | 900 |  |  | 12000 | 12000 |
| 25,200 |  | 300 | 900 |  |  | 12000 | 12000 |
| 25,300 | 100 | 300 | 900 |  |  | 12000 | 12000 |
| 25,400 | 200 | 300 | 900 |  |  | 12000 | 12000 |
| 25,500 |  | 600 | 900 |  |  | 12000 | 12000 |
| 25,600 | 100 | 600 | 900 |  |  | 12000 | 12000 |
| 25,700 | 200 | 600 | 900 |  |  | 12000 | 12000 |
| 25,800 |  |  | 1800 |  |  | 12000 | 12000 |
| 25,900 | 100 |  | 1800 |  |  | 12000 | 12000 |
| 26,000 | 200 |  | 1800 |  |  | 12000 | 12000 |
| 26,100 |  | 300 | 1800 |  |  | 12000 | 12000 |
| 26,200 | 100 | 300 | 1800 |  |  | 12000 | 12000 |
| 26,300 | 200 | 300 | 1800 |  |  | 12000 | 12000 |
| 26,400 |  | 600 | 1800 |  |  | 12000 | 12000 |
| 26,500 | 100 | 600 | 1800 |  |  | 12000 | 12000 |
| 26,600 | 200 | 600 | 1800 |  |  | 12000 | 12000 |
| 26,700 |  |  |  | 2700 |  | 12000 | 12000 |
| 26,800 | 100 |  |  | 2700 |  | 12000 | 12000 |
| 26,900 | 200 |  |  | 2700 |  | 12000 | 12000 |
| 27,000 |  | 300 |  | 2700 |  | 12000 | 12000 |
| 27,100 | 100 | 300 |  | 2700 |  | 12000 | 12000 |
| 27,200 | 200 | 300 |  | 2700 |  | 12000 | 12000 |
| 27,300 |  | 600 |  | 2700 |  | 12000 | 12000 |
| 27,400 | 100 | 600 |  | 2700 |  | 12000 | 12000 |
| 27,500 | 200 | 600 |  | 2700 |  | 12000 | 12000 |
| 27,600 |  |  | 900 | 2700 |  | 12000 | 12000 |
| 27,700 | 100 |  | 900 | 2700 |  | 12000 | 12000 |
| 27,800 | 200 |  | 900 | 2700 |  | 12000 | 12000 |
| 27,900 |  | 300 | 900 | 2700 |  | 12000 | 12000 |
| 28,000 | 100 | 300 | 900 | 2700 |  | 12000 | 12000 |
| 28,100 | 200 | 300 | 900 | 2700 |  | 12000 | 12000 |
| 28,200 |  | 600 | 900 | 2700 |  | 12000 | 12000 |
| 28,300 | 100 | 600 | 900 | 2700 |  | 12000 | 12000 |
| 28,400 | 200 | 600 | 900 | 2700 |  | 12000 | 12000 |
| 28,500 |  |  | 1800 | 2700 |  | 12000 | 12000 |
| 28,600 | 100 |  | 1800 | 2700 |  | 12000 | 12000 |
| 28,700 | 200 |  | 1800 | 2700 |  | 12000 | 12000 |
| 28,800 |  | 300 | 1800 | 2700 |  | 12000 | 12000 |
| 28,900 | 100 | 300 | 1800 | 2700 |  | 12000 | 12000 |
| 29,000 | 200 | 300 | 1800 | 2700 |  | 12000 | 12000 |
| 29,100 |  | 600 | 1800 | 2700 |  | 12000 | 12000 |
| 29,200 | 100 | 600 | 1800 | 2700 |  | 12000 | 12000 |
| 29,300 | 200 | 600 | 1800 | 2700 |  | 12000 | 12000 |
| 29,400 |  |  |  | 5400 |  | 12000 | 12000 |
| 29,500 | 100 |  |  | 5400 |  | 12000 | 12000 |
| 29,600 | 200 |  |  | 5400 |  | 12000 | 12000 |
| 29,700 |  | 300 |  | 5400 |  | 12000 | 12000 |
| 29,800 | 100 | 300 |  | 5400 |  | 12000 | 12000 |
| 29,900 | 200 | 300 |  | 5400 |  | 12000 | 12000 |
| 30,000 |  | 600 |  | 5400 |  | 12000 | 12000 |
| 30,100 | 100 | 600 |  | 5400 |  | 12000 | 12000 |
| 30,200 | 200 | 600 |  | 5400 |  | 12000 | 12000 |
| 30,300 |  |  | 900 | 5400 |  | 12000 | 12000 |
| 30,400 | 100 |  | 900 | 5400 |  | 12000 | 12000 |
| 30,500 | 200 |  | 900 | 5400 |  | 12000 | 12000 |
| 30,600 |  | 300 | 900 | 5400 |  | 12000 | 12000 |
| 30,700 | 100 | 300 | 900 | 5400 |  | 12000 | 12000 |
| 30,800 | 200 | 300 | 900 | 5400 |  | 12000 | 12000 |
| 30,900 |  | 600 | 900 | 5400 |  | 12000 | 12000 |
| 31,000 | 100 | 600 | 900 | 5400 |  | 12000 | 12000 |
| 31,100 | 200 | 600 | 900 | 5400 |  | 12000 | 12000 |
| 31,200 |  |  | 1800 | 5400 |  | 12000 | 12000 |
| 31,300 | 100 |  | 1800 | 5400 |  | 12000 | 12000 |
| 31,400 | 200 |  | 1800 | 5400 |  | 12000 | 12000 |
| 31,500 |  | 300 | 1800 | 5400 |  | 12000 | 12000 |
| 31,600 | 100 | 300 | 1800 | 5400 |  | 12000 | 12000 |
| 31,700 | 200 | 300 | 1800 | 5400 |  | 12000 | 12000 |
| 31,800 |  | 600 | 1800 | 5400 |  | 12000 | 12000 |
| 31,900 | 100 | 600 | 1800 | 5400 |  | 12000 | 12000 |
| 32,000 |  |  |  |  | 8000 | 12000 | 12000 |
| 32,100 | 100 |  |  |  | 8000 | 12000 | 12000 |
| 32,200 | 200 |  |  |  | 8000 | 12000 | 12000 |
| 32,300 |  | 300 |  |  | 8000 | 12000 | 12000 |
| 32,400 | 100 | 300 |  |  | 8000 | 12000 | 12000 |
| 32,500 | 200 | 300 |  |  | 8000 | 12000 | 12000 |
| 32,600 |  | 600 |  |  | 8000 | 12000 | 12000 |
| 32,700 | 100 | 600 |  |  | 8000 | 12000 | 12000 |
| 32,800 | 200 | 600 |  |  | 8000 | 12000 | 12000 |
| 32,900 |  |  | 900 |  | 8000 | 12000 | 12000 |
| 33,000 | 100 |  | 900 |  | 8000 | 12000 | 12000 |
| 33,100 | 200 |  | 900 |  | 8000 | 12000 | 12000 |
| 33,200 |  | 300 | 900 |  | 8000 | 12000 | 12000 |
| 33,300 | 100 | 300 | 900 |  | 8000 | 12000 | 12000 |
| 33,400 | 200 | 300 | 900 |  | 8000 | 12000 | 12000 |
| 33,500 |  | 600 | 900 |  | 8000 | 12000 | 12000 |
| 33,600 | 100 | 600 | 900 |  | 8000 | 12000 | 12000 |
| 33,700 | 200 | 600 | 900 |  | 8000 | 12000 | 12000 |
| 33,800 |  |  | 1800 |  | 8000 | 12000 | 12000 |
| 33,900 | 100 |  | 1800 |  | 8000 | 12000 | 12000 |
| 34,000 | 200 |  | 1800 |  | 8000 | 12000 | 12000 |
| 34,100 |  | 300 | 1800 |  | 8000 | 12000 | 12000 |
| 34,200 | 100 | 300 | 1800 |  | 8000 | 12000 | 12000 |
| 34,300 | 200 | 300 | 1800 |  | 8000 | 12000 | 12000 |
| 34,400 |  | 600 | 1800 |  | 8000 | 12000 | 12000 |
| 34,500 | 100 | 600 | 1800 |  | 8000 | 12000 | 12000 |
| 34,600 | 200 | 600 | 1800 |  | 8000 | 12000 | 12000 |
| 34,700 |  |  |  | 2700 | 8000 | 12000 | 12000 |
| 34,800 | 100 |  |  | 2700 | 8000 | 12000 | 12000 |
| 34,900 | 200 |  |  | 2700 | 8000 | 12000 | 12000 |
| 35,000 |  | 300 |  | 2700 | 8000 | 12000 | 12000 |
| 35,100 | 100 | 300 |  | 2700 | 8000 | 12000 | 12000 |
| 35,200 | 200 | 300 |  | 2700 | 8000 | 12000 | 12000 |
| 35,300 |  | 600 |  | 2700 | 8000 | 12000 | 12000 |
| 35,400 | 100 | 600 |  | 2700 | 8000 | 12000 | 12000 |
| 35,500 | 200 | 600 |  | 2700 | 8000 | 12000 | 12000 |
| 35,600 |  |  | 900 | 2700 | 8000 | 12000 | 12000 |
| 35,700 | 100 |  | 900 | 2700 | 8000 | 12000 | 12000 |
| 35,800 | 200 |  | 900 | 2700 | 8000 | 12000 | 12000 |

-continued

Subject Matter:
DGM Example: 7 orifices (4 tri-state), .25% steps

Orifice No. (Max Flow), Actual Flow at Specific Points

| TOTAL FLOW (SCFH) | Tri-stable solenoids | | | | Bi-stable solenoids | | |
|---|---|---|---|---|---|---|---|
| | 1 (200) | 2 (600) | 3 (1,800) | 4 (5,400) | 5 (8,000) | 6 (12,000) | 7 (12,000) |
| 35,900 |  | 300 | 900 | 2700 | 8000 | 12000 | 12000 |
| 36,000 | 100 | 300 | 900 | 2700 | 8000 | 12000 | 12000 |
| 36,100 | 200 | 300 | 900 | 2700 | 8000 | 12000 | 12000 |
| 36,200 |  | 600 | 900 | 2700 | 8000 | 12000 | 12000 |
| 36,300 | 100 | 600 | 900 | 2700 | 8000 | 12000 | 12000 |
| 36,400 | 200 | 600 | 900 | 2700 | 8000 | 12000 | 12000 |
| 36,500 |  |  | 1800 | 2700 | 8000 | 12000 | 12000 |
| 36,600 | 100 |  | 1800 | 2700 | 8000 | 12000 | 12000 |
| 36,700 | 200 |  | 1800 | 2700 | 8000 | 12000 | 12000 |
| 36,800 |  | 300 | 1800 | 2700 | 8000 | 12000 | 12000 |
| 36,900 | 100 | 300 | 1800 | 2700 | 8000 | 12000 | 12000 |
| 37,000 | 200 | 300 | 1800 | 2700 | 8000 | 12000 | 12000 |
| 37,100 |  | 600 | 1800 | 2700 | 8000 | 12000 | 12000 |
| 37,200 | 100 | 600 | 1800 | 2700 | 8000 | 12000 | 12000 |
| 37,300 | 200 | 600 | 1800 | 2700 | 8000 | 12000 | 12000 |
| 37,400 |  |  |  | 5400 | 8000 | 12000 | 12000 |
| 37,500 | 100 |  |  | 5400 | 8000 | 12000 | 12000 |
| 37,600 | 200 |  |  | 5400 | 8000 | 12000 | 12000 |
| 37,700 |  | 300 |  | 5400 | 8000 | 12000 | 12000 |
| 37,800 | 100 | 300 |  | 5400 | 8000 | 12000 | 12000 |
| 37,900 | 200 | 300 |  | 5400 | 8000 | 12000 | 12000 |
| 38,000 |  | 600 |  | 5400 | 8000 | 12000 | 12000 |
| 38,100 | 100 | 600 |  | 5400 | 8000 | 12000 | 12000 |
| 38,200 | 200 | 600 |  | 5400 | 8000 | 12000 | 12000 |
| 38,300 |  |  | 900 | 5400 | 8000 | 12000 | 12000 |
| 38,400 | 100 |  | 900 | 5400 | 8000 | 12000 | 12000 |
| 38,500 | 200 |  | 900 | 5400 | 8000 | 12000 | 12000 |
| 38,600 |  | 300 | 900 | 5400 | 8000 | 12000 | 12000 |
| 38,700 | 100 | 300 | 900 | 5400 | 8000 | 12000 | 12000 |
| 38,800 | 200 | 300 | 900 | 5400 | 8000 | 12000 | 12000 |
| 38,900 |  | 600 | 900 | 5400 | 8000 | 12000 | 12000 |
| 39,000 | 100 | 600 | 900 | 5400 | 8000 | 12000 | 12000 |
| 39,100 | 200 | 600 | 900 | 5400 | 8000 | 12000 | 12000 |
| 39,200 |  |  | 1800 | 5400 | 8000 | 12000 | 12000 |
| 39,300 | 100 |  | 1800 | 5400 | 8000 | 12000 | 12000 |
| 39,400 | 200 |  | 1800 | 5400 | 8000 | 12000 | 12000 |
| 39,500 |  | 300 | 1800 | 5400 | 8000 | 12000 | 12000 |
| 39,600 | 100 | 300 | 1800 | 5400 | 8000 | 12000 | 12000 |
| 39,700 | 200 | 300 | 1800 | 5400 | 8000 | 12000 | 12000 |
| 39,800 |  | 600 | 1800 | 5400 | 8000 | 12000 | 12000 |
| 39,900 | 100 | 600 | 1800 | 5400 | 8000 | 12000 | 12000 |
| 40,000 | 200 | 600 | 1800 | 5400 | 8000 | 12000 | 12000 |

GENERAL DESCRIPTION OF THE DRAWINGS

One embodiment of the present invention is illustrated in the accompanying drawings, in which like numerals denote like parts throughout the several views, and in which.

DETAILED DESCRIPTION OF THE DRAWINGS

Figure 1:
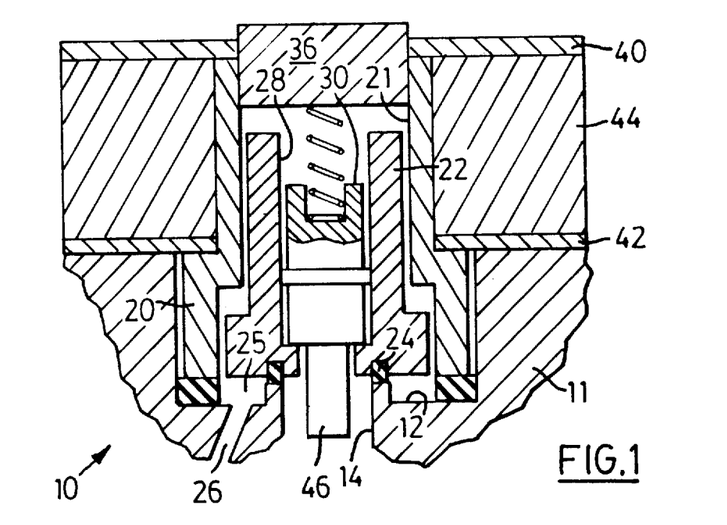
FIGS. 1, 2 and 3 are somewhat schematic, axial sectional views through one design of a tri-stable solenoid-enabled valve useful in carrying out this invention, and represent respectively the fully closed, the partially open and the fully open condition of the valve.
Figure 2:
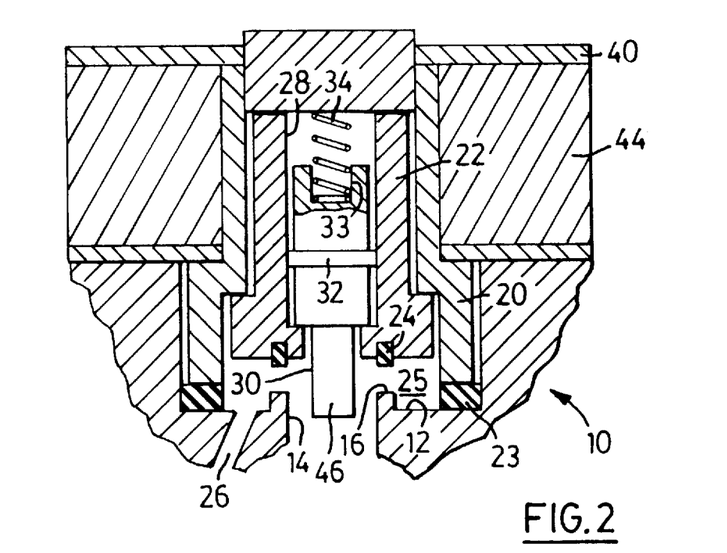
Figure 3:
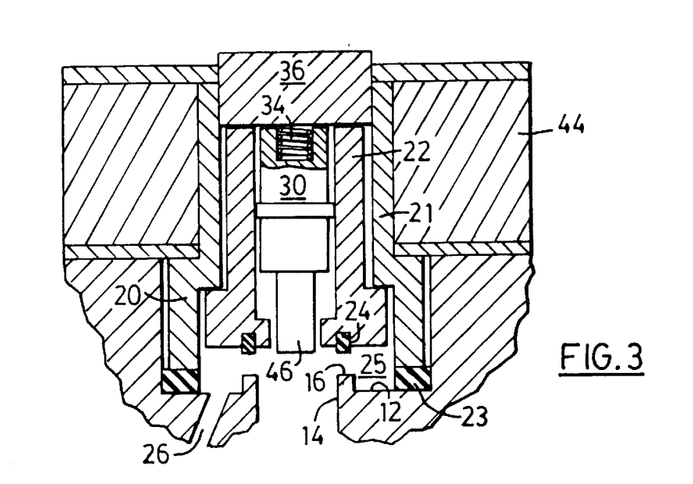

FIGS. 1, 2 and 3 illustrate a tri-stable solenoid-operated valve shown generally at the numeral 10, the valve 10 including a body 11 (only partly shown in the drawings), the body 11 defining an internal recess 12. As can be seen, an outlet passageway 14 communicates with and leads the way from the recess 12, with a valve seat 16 surrounding the outlet passageway 14.

A piston guide 20 is fixedly lodged within the recess 12 and defines a cylindrical internal guideway 21 for a primary piston 22 which is adapted to undergo vertical reciprocating movement toward and away from the valve seat 16, between a lower first position and a higher second position. An annular seal 23 is compressed into the lower outer corner of the recess 12 by the lower portion of the piston guide 20, the latter exhibiting an annular groove for receiving part of the seal 23. The seal 23 thus prevents escape of gas into the space between the recess 12 and the piston guide 20.

Together, the body 10 and the piston guide 20 define an internal chamber 25 through which a gaseous material can pass when the valve is fully or partially open.

FIG. 1 shows the primary piston 22 in its lower first position. It will be noted that the primary piston 22 supports closure means in the form of an annular ring seal 24 which is sized and positioned to fully close against the valve seat 16 when the primary piston 22 is in its lowest position (this being its first position).

It will be noted further than an inlet passageway 26 opens into the chamber 25 such that it is denied communication with the outlet passageway 14 when the primary piston 22 is in its first or lowermost position.

In the illustrated embodiment, the primary piston 22 provides an internal guideway 28 along which a secondary piston 30 is adapted to slide, the guideway 28 being substantially cylindrical, as is the secondary piston 30, the latter having a sealing ring 32 which spaces it away from the guideway 28, at the same time sealing the space above the ring 32 from the space below the ring. If desired, a further sealing ring, spaced longitudinally from the ring 32, could be provided for the purpose of maintaining the axis of the secondary piston 30 parallel with the axis of the guideway 28.

The secondary piston 30 has a blind, coaxial, cylindrical recess 33 for receiving the bottom end of a compression coil spring 34, the upper end of which bears against a cylindrical magnetic pole piece 36, held in place with respect to the upper part of the piston guide 20. It will further be noted that the valve 10 includes a first flux washer 40 near the top, aligned with the magnetic pole piece 36, and also includes a second flux washer 42 located at a position spaced below the first flux washer 40. The space between the flux washers 40 and 42 receives a conventional cylindrical solenoid coil 44, which, as described below, is adapted to be energized either to a first predetermined level or to a second predetermined level.

The secondary piston 30 includes a cylindrical portion 46 which projects downwardly into the outlet passageway 14 when both of the pistons are at their respective lowermost positions. This causes a certain degree of occlusion of the passageway 14, but such occlusion is of no importance when the annular ring seal 24 (supported on the primary piston 22) is closed against the valve seat 16. This condition is shown in FIG. 1, which represents the situation when the solenoid coil 44 is not energized, thus allowing the compression coil spring 34 to push both of the pistons 22 and 30 to their respective lowermost positions, and closing the valve 10.

FIG. 2 shows the intermediate flow state, when the solenoid coil 44 is energized to said second predetermined level. This degree of energization is sufficient to raise the primary piston 22 to its uppermost position (in which it abuts the magnetic pole piece 36), but is insufficient to raise the secondary piston 30 as well. In consequence, the downwardly projecting cylindrical portion 46 of the secondary piston 30 still projects part-way into the outlet passageway 14, such that it partially occludes the opening, thus partially limiting the flow of fluid through the valve.

FIG. 3 shows the fully open position of the valve, in which the solenoid coil 44 is energized to said first predetermined level, producing a magnetic flux which is sufficient to raise both the primary and the secondary pistons 22 and 30 to their uppermost positions, defined by abutment between both pistons 22 and 30 and the magnetic pole piece 36. In this condition (wherein both pistons are at their second positions) the downwardly projecting cylindrical portion 46 of the secondary piston 30 no longer projects into the outlet (passageway 14), and thus does not interfere with fluid flow through the valve.

As a non-limiting example, if the diameter of the downwardly projecting cylindrical portion 46 of the secondary piston 30 were 0.707 of the diameter of the passageway 14, the opening would be approximately 50% occluded, and would provide approximately 50% of the orifice's nominal flow.

Figure 4:
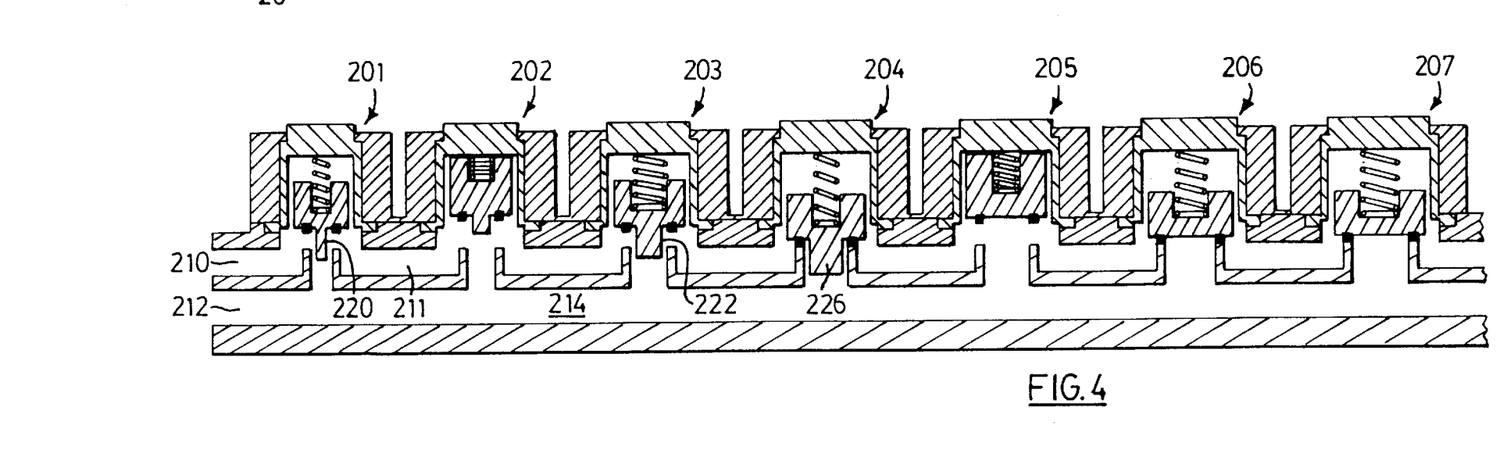
FIG. 4 is a schematic representation of seven valves connected in parallel between a common gas inlet and a common gas outlet, of which the four leftward valves are tri-stable valves.

Attention is now directed to FIG. 4, in which a plurality of valves 201, 202, 203, 204, 205, 206 and 207 can be seen to be connected in parallel between a common gas inlet 210 and a common gas outlet 212. Further, it will be noted that valves 201, 202, 203 and 204 are all tri-stable valves, and that the condition illustrated in FIG. 4 has valves 201 and 203 in the 50% mode, has valve 202 in the 100% mode, and has valve 204 in the 0% mode (i.e. entirely closed).

Of the bi-stable valves shown in FIG. 4, valve 205 is in its fully opened, 100% mode, while the remaining valves 206 and 207 are in the closed or 0% mode.

It is pointed out that the drawing of FIG. 4 is somewhat simplified as compared to FIGS. 1–3, in that no distinction is made between the first valve member and the second valve member. The position of the protruding cylindrical portions, however, are clearly indicated in FIG. 4. Specifically, the cylindrical portions 220 and 222 of the tri-stable valves 201 and 203 are partly projecting into their respective outlet orifices which proceed to the common gas outlet manifold 212. By contrast, the cylindrical portion 224 of the valve 202 is fully withdrawn from the passageway that leads to the gas outlet manifold 214, while the cylindrical portion 226 of valve 204 projects fully into the respective outlet. The latter condition is of no consequence, of course, because in the 0% mode, the valve 204 is completely closed.

It is important to note that the inlet manifold 211, which connects all solenoid valves, is sized and shaped to provide all valves with the same stagnation pressure. Also, the manifold and solenoid cavities are configured to prevent swirl.

It is of further importance that the inlet manifold 211 be provided with sensors to measure gas inlet stagnation pressure and temperature. Also, a sensor may be added (for sub-sonic uses) to measure differential pressure across the orifices. In addition, a gas outlet pressure sensor may be added to assist sub-sonic calculations or to warn of sub-sonic operation.

Further, the metering orifices ideally have diverging pressure recovery sections, often called sonic nozzles.

Generally, the bi-stable solenoid valves are assumed to have a stroke >40% of the orifice diameter, so that the stroke does not affect flow.

It should also be noted that the tri-stable solenoids may be configured differently from those represented in the drawings attached to this specification. Also, the tri-stable solenoids are assumed to have strokes and other dimensions such that the 50% and 100% flow points are not sensitive to excitation variation.

Figure 5:
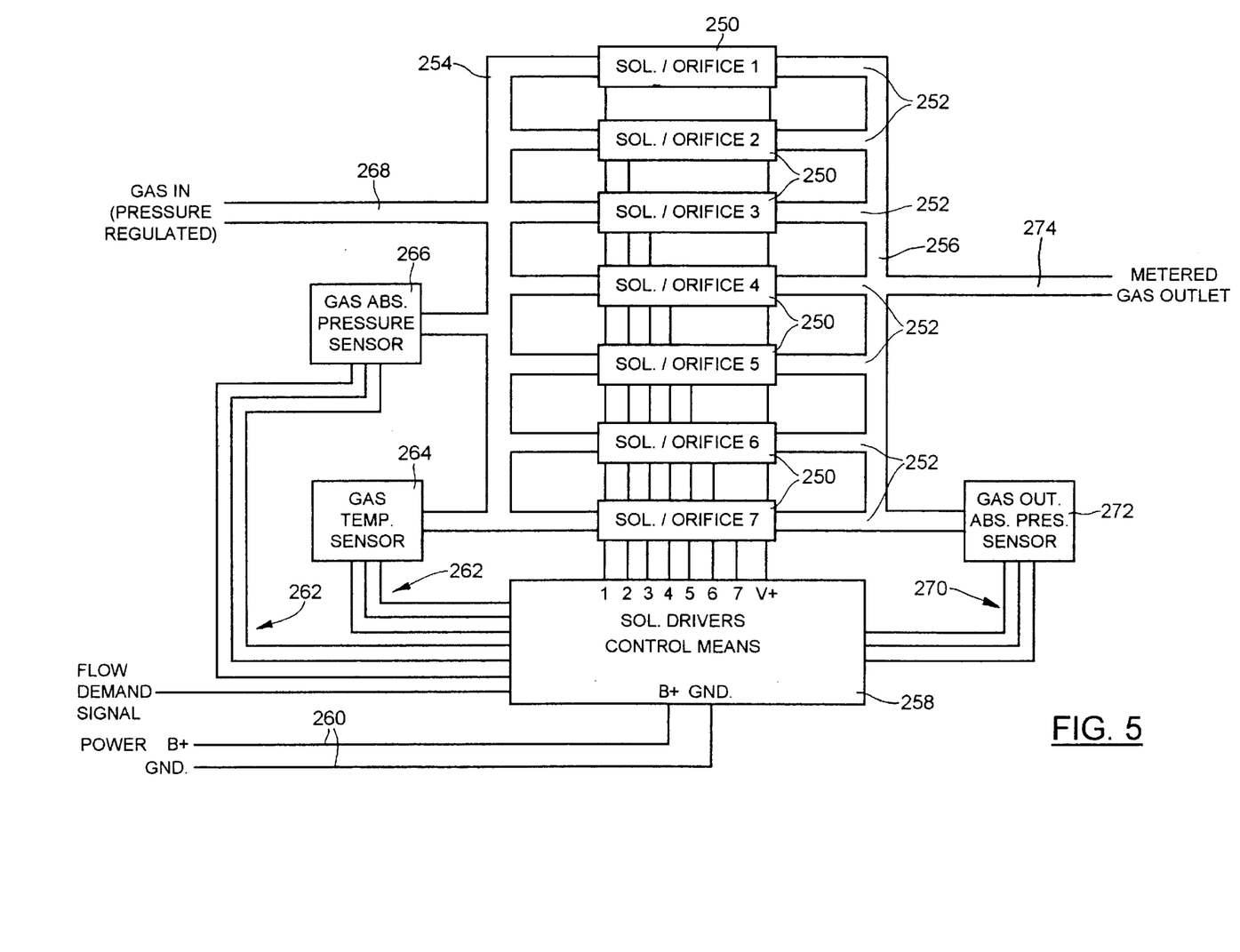
FIG. 5 is a schematic diagram of a typical apparatus utilizing seven valves, showing various sensor locations.

Attention is now directed to FIG. 5, which is a schematic diagram of a typical apparatus utilizing seven valves 250, which are located in individual conduits 252, the latter each extending between a common inlet manifold 254 and a common outlet manifold 256.

It will be noted that there is provided a control means 258 which receives power along lines 260, and receives analog inputs 262 from an inlet gas temperature sensor 264 and from an absolute gas pressure sensor 266. The conduit 268 provides a gas inlet (pressure regulated).

An analog input 270 to the control means 258 is provided by an absolute pressure sensor 272 detecting the pressure of the gas in the common outlet manifold 256. A conduit 274 constitutes an outlet for metered gas.

Figure 6:
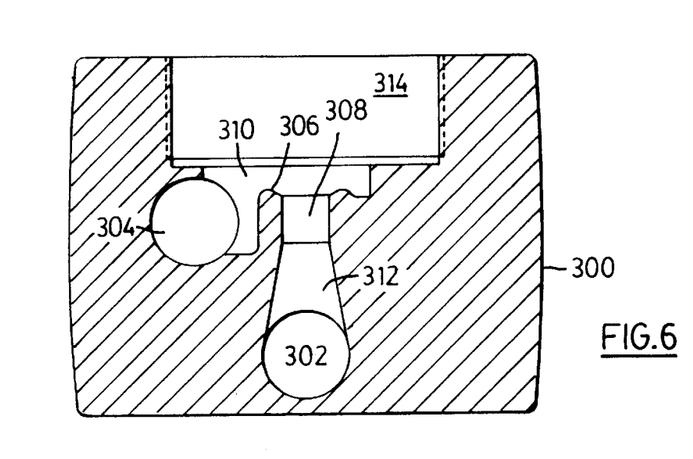
FIG. 6 is a longitudinal section through a typical valve, showing a diverging pressure-recovery profile.

Attention is now directed to FIG. 6, which is a longitudinal section through a typical valve. In FIG. 6, a block member 300 contains bores 302 and 304 constituting the outlet and inlet manifolds, respectively.

The block member 300 also defines a valve seat 306 surrounding a cylindrical passageway 308 which communicates at the top with a chamber 310 which in turn communicates with the inlet manifold bore 304. At the bottom of the cylindrical passageway 308 there is provided a diverging pressure-recovery profile 12 which in turn communicates with the outlet manifold bore 302.

In axial alignment with the cylindrical portion 308, there is provided an internally threaded cylindrical recess 314 which is adapted to threadably receive the piston guide 20 illustrated in FIGS. 1, 2 and 3.

While one embodiment of this invention has been illustrated in the accompanying drawings and described hereinabove, it will be evident to those skilled in the art that changes and modifications may be made therein, without departing from the essence of this invention, as set forth in the appended claims.

The embodiments of the invention in which an exclusive property or privilege is claimed are defined as follows:

1. For use with a digital gas metering system, the combination of:
   a common inlet manifold,
   a common outlet manifold,
   a plurality of conduits each extending between the inlet manifold and the outlet manifold,
   a solenoid-operated valve in each conduit,
   at least one of said valves being a bi-stable valve,
   at least two of said valves being tri-stable valves, each tri-stable valve having a highest flow setting, a lowest flow setting, and an intermediate flow setting; said lowest flow setting being substantially zero flow, and said highest flow settings forming a geometric progression in which each term is substantially triple the preceding term.

2. The combination claimed in claim 1, in which, for each tri-stable valve, the intermediate flow setting provides a flow which is substantially 50% of the flow provided by the highest flow setting.

3. The combination claimed in claim 1 or claim 2, in which each said conduit defines a diverging pressure-recovery profile immediately downstream of its respective valve.

4. The invention claimed in claim 1 or claim 3, forming an operative part of a digital gas metering system which includes sensor means for determining the inlet gas temperature and the stagnation absolute pressure; the system further including a control means for receiving the gas physical parameters, for calculating the required solenoid valve control signals, and for electrically driving the solenoids.

5. The invention claimed in claim 1 or claim 3, forming an operative part of a digital gas metering system which includes first sensor means for determining the inlet gas temperature and the stagnation absolute pressure; the system further including a control means for receiving the gas physical parameters, for calculating the required solenoid value control signals, and for electrically driving the solenoids; the system further including second sensor means for sensing the values of the outlet gas pressure and temperature, and for providing these values to the said control means, thus permitting the calculation of sub-sonic mass flow.

* * * * *